United States Patent [19]

Baratz et al.

[11] Patent Number: 4,926,414
[45] Date of Patent: May 15, 1990

[54] CONTROL POINT SESSION SYNCHRONIZATION IN A NETWORK

[75] Inventors: Alan E. Baratz, Chappaqua; George A. Grover, Mahopac, both of N.Y.

[73] Assignee: International Business Machines Corporation, Armonk, N.Y.

[21] Appl. No.: 62,003

[22] Filed: Jun. 12, 1987

[51] Int. Cl.$^5$ .............................................. H04L 5/14
[52] U.S. Cl. ........................................ 370/31; 370/24; 364/242.94; 364/265.1; 364/222.2; 364/284.4; 364/919; 364/940.64; 364/940.62
[58] Field of Search ... 364/200 MS File, 900 MS File; 371/7, 12, 14; 370/24, 31; 340/700

[56] References Cited

U.S. PATENT DOCUMENTS

| | | | |
|---|---|---|---|
| 4,112,488 | 9/1978 | Smith, III | 364/200 |
| 4,353,126 | 10/1982 | Bergmann | 370/24 |
| 4,546,429 | 10/1985 | Chan et al. | 364/200 |
| 4,570,261 | 2/1986 | Maher | 364/200 |
| 4,599,719 | 7/1986 | Breen et al. | 370/31 |

*Primary Examiner*—Gareth D. Shaw
*Assistant Examiner*—Gopal C. Ray
*Attorney, Agent, or Firm*—Jack M. Arnold

[57] ABSTRACT

In a computer network a logical duplex session between control points of adjacent network nodes is comprised of two physical half duplex sessions. Each half duplex session includes the send session of one node and the receive session of the adjacent node. In the event of a session failure at either node, the session from the other node is also deactivated so the nodes may begin recovery in phase with each other. Unique messages are exchanged between the adjacent nodes to distinguish new from old messages, such that the nodes are resynchronized only when new messages are present on each session.

10 Claims, 7 Drawing Sheets

A's OUTGOING & B's INCOMING SESSION (SOLID LINE)
B's OUTGOING & A's INCOMING SESSION (DASHED LINE)

CONTROL POINT (CP) FLOW :

CONTROL POINT SESSION SYNCHRONIZATION IN A NETWORK

BACKGROUND OF THE INVENTION

1. Related Patent Applications U.S. Pat. No. 4,827,411, by A.H. Arrowood et al, issued May 2, 1989 and entitled "Method of Maintaining a Topology Database", discloses a method of maintaining a common database of link and node topology information at plural nodes of a computer network. Said method uses techniques disclosed in the present application.

Co-pending patent application Ser. No. 07/062,269, by A.E. Baratz et al, filed June 15, 1987, and entitled "Locating Resources in Computer Networks", discloses a technique for locating devices and other resources (programs, databases, etc) in computer networks which uses communication techniques disclosed herein.

Co-pending patent application Ser. No. 07/062,280 by A.E. Baratz et al., filed June 15, 1987, and entitled "Method For Disseminating Network State Information", discloses a technique for disseminating network state information in SNA networks, and which is related in general to this invention.

2. Field of the Invention

The present invention relates to computer networks and particularly to how to resynchronize the recovery of a logical full duplex session which is comprised of two physical half duplex sessions.

3. Terms and Concepts

The following discussion of terms and concepts may be helpful for understanding the problems solved by the present invention. Concepts and terms presently considered to be new are so indicated below. Others are described in one or more of these published references:

(1) Systems Network Architecture, Concepts and Products, IBM Publication GC30-3072-3, Copyright International Business Machines Corporation, October 1986;

(2) Systems Network Architecture, Technical Overview, IBM Publication GC30-3073-2, Copyright International Business Machines Corporation, September 1986;

(3) Systems Network Architecture, Transaction Programmer's Reference Manual for LU Type 6.2, IBM Publication GC30-3084-2, Copyright International Business Machines Corporation, November 1985;

(4) SNA Format and Protocol Reference Manual: Architecture Logic For Type 2.1 Nodes, IBM Publication SC30-3422-0, Copyright International Business Machines Corporation, December 1986;

(5) Systems Network Architecture Reference Summary, IBM Publication GA27-3136-6, Copyright International Business Machines Corporation, May 1985;

(6) Synchronous Data Link Control Concepts, IBM Publication GA27-3093-3, Copyright International Business Machines Corporation, June 1986.

(7) IBM System 36 Advanced Peer to Peer Networking (APPN) Guide, IBM Publication SC21-9471-0, Copyright International Business Machines Corporation, October, 1986.

In general, networks comprise communication links formed within physical media or electromagnetic wave channels, and equipment coupled to such links at "nodes" or points of connection. Computer networks are characterized by the presence of computers at some of the nodes, as distinguished from networks having only so-called "dumb terminals" at all nodes.

Nodes controlling communications in a network require certain information in respect to physical and logical characteristics and states of links and nodes ("topology" information), network error conditions, and resources available at the nodes ("resource" information). The term "network state" information is used presently to characterize information falling into any of these categories.

SNA networks presently classify nodes in four type categories—2.0, 2.1, 4, and 5—according to logical and/or physical characteristics of equipment contained at the nodes (e.g. see GC30-3073 above, pages 1–20 and 1–21). For present purposes, a new species of type 2.1 node termed type APPN is defined, and within that species two new subspecies of nodes types NN and EN are defined. Type APPN nodes as presently defined are nodes capable of certain advanced peer-to-peer networking (hence the acronym "APPN") types of communication operations to be described. Such operations involve transfers of node capability information and other network state information in certain new data link and session communication forms described later. Type EN nodes (also termed "end nodes") are situated at logical end boundaries of the network in that they do not act to communicate information between other nodes.

Type NN nodes (also termed "network nodes") are nodes which may carry communications between other nodes. End nodes generally contain end use devices such as printers, displays, etc., or computers such as data hosts which only support devices not accessible as network components. Network nodes contain computers which in addition to processing data are adapted for providing communication services for accessing resources at other nodes.

In such networks, information is communicated in various formats. Two forms presently of interest are data link type communications and sessions. In relation to sessions, data link communications are generally more direct (only between directly linked nodes), shorter and less extensive in the amount and type of information which can be transferred. Data link communications are more fully described in GA27-3093 above, and sessions are more fully described in GC30-3073 above. A "control point" is a node component which can activate sessions with other nodes and provides control services and information needed by other components of the respective node and/or control points nodes (see e.g. page 3-3 of GC30-3073 above APPN node has one and only one control point.

Of particular interest presently, are XID type data link communications (see Chapter 2 in GA27-3136 above) and sessions between network control points (see GC30-3072 above, page 23). XID communications are used for determining characteristics of other nodes. During activation, APPN nodes use XID communication to selectively instigate certain newly defined actions relative to other APPN nodes. Such actions include additional data link type exchanges, one to determine capabilities of the responding node and contingent on that determination a further exchange to establish a pair of oppositely directed half-duplex sessions of a newly defined relative to the responding node. These sessions together presently are termed a type APPN logical CP-CP session (or simply a CP-CP session), and they are used to permit the nodes to transfer additional network state information to each other as and when needed. Although each of the two sessions above is half-duplex, for reasons discussed later they are used only in simplex modes.

Logical units (LU's) manage the flow of information between end users and the network (refer e.g. to GC30-3073-2 above, at page 1-11). End users communicate with each other only indirectly via associated LU's. SNA architecture defines LU types 1, 2, 3, 4, 6.1 and 6.2 having specific responsibilities; types 1, 4, 6.1 and 6.2 supporting communications between programs. Associated with each LU type is a corresponding type of communication protocol.

4. Prior Art

Computer networks for processing and transmitting data are of course well known. In a typical such network, one or more computers running under control of respective operating systems, and application/transaction software, may interact through communications controllers and communications media to exchange data and to control operations of end use devices such as printers, displays, etc. Furthermore, computer networks susceptible of distributed control at plural active no are also well known, Such networks usually are controlled in accordance with an architecture or set of basic protocols which ensures orderly flow of information between the nodes as well as between resources supported at the nodes. Examples of such architectures are given in: (1) "Computer Network Architecture", by S. Wecker in Computer, September 1979, and (2) "An Introduction To Network Architectures and Protocols", by P.E. Green in the IBM Systems Journal, Vol 18 No. 2, 1979. These articles describe various architectures, such as SNA, DNA, etc, in terms of a layered hierarchical structure where actions relative to accessing the physical communication medium are at the lowest layer or level, actions effecting exchanges with end users of the network are at the highest level, and other actions are at intermediate levels. In SNA, 7 such levels are defined in ascending order as: physical control level, data link control level, path control level, transmission control level, data flow control level, presentation services level and transaction services level. The functions performed at these levels are specified in GC30-3073-2 above at page 1-3. An architecture proposed by the International Organization For Standardization (ISO) comprises a 7-layer structure with levels having different but somewhat overlapping functions in relation to the SNA hierarchy. This is described by H. Zimmerman "OSI Reference Model—The Model Of Architecture For Open Systems Interconnection," IEEE Transactions On Communications, April 1980; and feature the layers: physical, data link, network, transport sessions, presentation and application.

According to the present invention a method is set forth for resynchronizing the recovery of a logical full duplex session, comprised of two half physical half duplex sessions, operating between two adjacent nodes.

DISCLOSURE OF THE INVENTION

In a computer network a logical duplex session between control points of adjacent network nodes is comprised of two physical half duplex sessions. Each half duplex session includes the send session of one node and the receive session of the adjacent node. In the event of a session failure at either node, the session from the other node is also deactivated so the nodes may begin recovery in phase with each other. Unique messages are exchanged between the adjacent nodes to distinguish new from old messages, such that the nodes are resynchronized only when new messages are present on each session.

BEST MODE FOR CARRYING OUT THE INVENTION

The invention is applicable to any computer network, but will be described in the context of the previously referenced IBM System 36 Advanced Peer to Peer Network (APPN).

Figure 1:
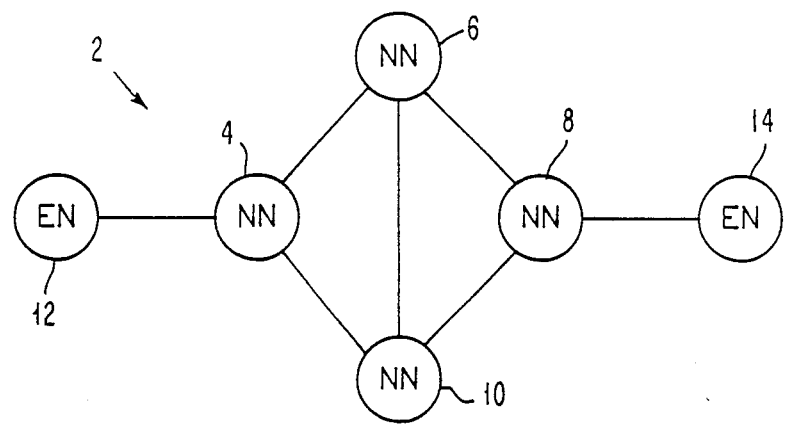
FIG. 1 is a diagram of an APPN network.

Refer now to FIG. 1 which illustrates a typical APPN 2. The network 2 includes network (NN's) 4, 6, 8 and 10 and end nodes (EN's) 12 and 14. The NN's in practice would be some type of computer such as the IBM system 36 and the EN's would be a personal computer or end user device such as a terminal or the like. A typical session may allow communication between users or applications at the EN's 12 and 14. The path or route taken by the session may be any one permitted by the physical connectivity which does not entail passage through any node more than once, e.g.: 12-4-6-8-14 or 12-4-10-6-8-14.

Figure 2:
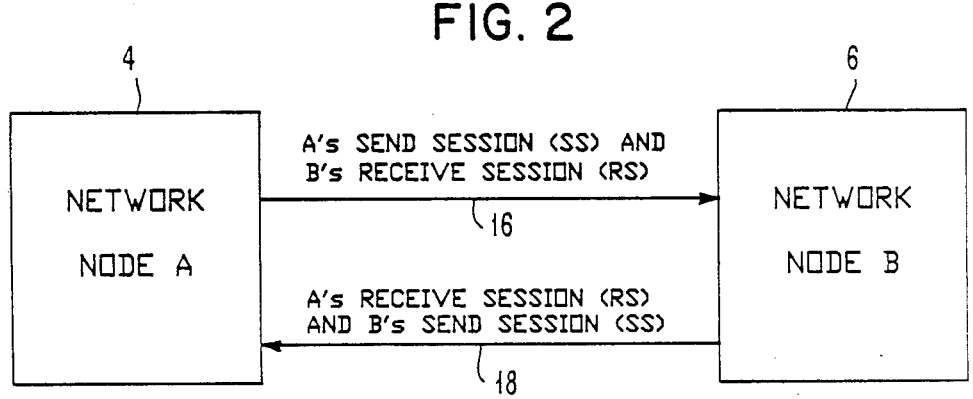
FIG. 2 is a diagram of a control point to control point logical duplex session between two adjacent network nodes.

Refer now to FIG. 2 which illustrates the connection of two physical half duplex sessions, which comprise a logical full duplex session, between two adjacent nodes. The two adjacent nodes chosen are the NN's 4 and 6 with physical half duplex sessions 16 and 18 connected therebetween to form a logical full duplex session.

The physical half duplex session 16 comprises NN4's (A) send session (SS) and NN6's (B) receive session (RS). The physical half duplex session 18 comprises NN4's (A) receive session (RS) and NN6's (B) send session (SS).

Each of the NN's such as A and B include an APPN control point. The function of the APPN Control Point is to perform the routing and directory functions, which includes conducting the network broadcasting operations which these services entail. In the instance of directory functions, directory searches are broadcast by a node which wants to locate a resource among other nodes of the network. In the case of routing, changes of status of physical resources in the network—typically links going down or coming up, or being added to the network—are broadcast by the network node which owns the physical resource in question. In the case of a link becoming inoperative, for example, once this status change has been broadcast to all network nodes, these nodes will exclude the link from calculations of new routes.

The broadcasts, and indeed nearly all other network control traffic messages as well, flow over single hop sessions which exist between the control points of each pair of adjacent network nodes. These special sessions for control traffic, as indicated previously, are called "Control Point sessions".

The management of these sessions—of their initiation and termination and, most importantly, of the resynchronization, reinitiating, and recovery processes which are needed in the event of session failures—is also a very important function of the APPN Control Point.

As shown in FIG. 2, it has been indicated that there must be a control point session running over each link which connects a pair of network nodes, and in fact, to achieve better performance, that two such sessions are provided for each link—one on which data is transmitted to a neighbor, and the other on which messages are received from the neighbor.

The sessions are LU 6.2 sessions, which are half duplex (i.e. which may flow alternately in each direction). By arranging so that each session sends messages in one direction only, the extra messages and the delays which are involved in the protocols for agreeing to change the direction of flow back and forth between the two session partners are eliminated. The logic of the Control Point is also somewhat simplified by the ability to send and receive streams of messages independently of each other.

It can be seen that this provision of two one-way sessions over a link is in effect roughly simulating the capability of a single full duplex session. This notion of simulating a duplex session in the System 36 APPN Control Point implementation will be carried even further in subsequent discussion.

Figure 3:
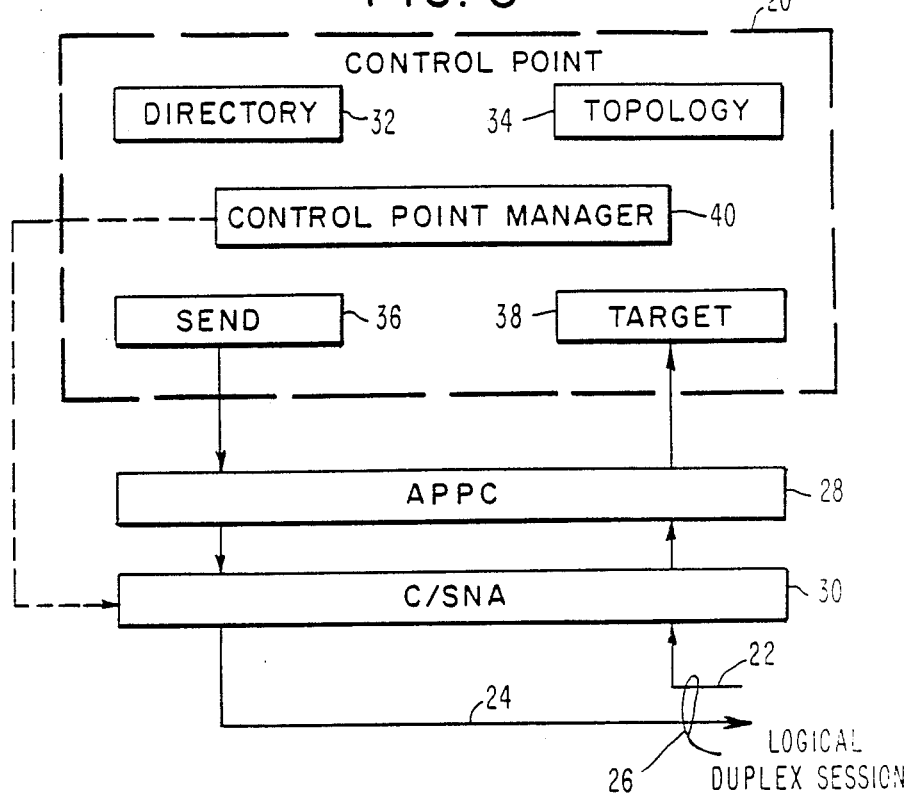
FIG. 3 is a diagram of a control point in a network node.

The structure of the APPN Control Point is depicted schematically in FIG. 3. Each of the components shown within the Control Point box 20 in this figure is an independent IBM System 36 task, operating asynchronously with respect to all other tasks to provide two physical half duplex sessions on lines 22 and 24 that comprise a logical full duplex session 26. The tasks and functions are:

1. All directory services are performed by the Directory component 32, including particularly the broadcasting of searches to locate a resource and the receipt of replies.
2. The Topology component 34 task performs all Route Selection Services, including the calculation of optimal routes and the broadcasting and receiving of changes of status of physical resources in the network.
3. The Send module 36 handles outgoing messages which are being sent by a Control Point to Control Points in adjacent nodes. In sending an outgoing message it uses that one of the two Control Point sessions which is reserved for outgoing traffic over a link. The Send module 36 passes the message to APPC 28, from whence it flows through C/SNA 30 and out over the link. C/SNA (the Combined Systems Network Architecture component) includes the handling of link control and other low level communication functions associated with a P.U. 2.1 type node.

The Control Point 20 as a whole may be regarded as an LU 6.2 application in that its access to the LU 6.2 Control Point sessions utilizes an APPC 28 interface which is, in most respects, identical to that which an ordinary user program would employ. The APPC (Advanced Peer-to-Peer Communications) component is the component which contains the LU 6.2 function 4. Target modules 38 are transaction programs which are evoked in separate instances for each conversation which an adjacent node initiates. They therefore handle incoming data and direct it to the appropriate receiving Control Point Component (for example, search responses to Directory 32 and link status changes to Topology 34). The second physical LU 6.2 session—reserved for the incoming direction—is used for this purpose.
5. The Control Point Manager component 40 coordinates the Control Point components and also provides the Control Point interface via APPC 28 with C/SNA 30 with respect to the node's own resources (e.g. the status of links, Control Point physical sessions, and the node itself). Also, recalling that the two physical half duplex sessions 22 and 24 comprise a simulated full duplex session 26, it is the task of Control Point Manager 40 to manage the state of this simulated full duplex session 26, which is called the logical Control Point session.

The problem of resynchronizing recovery following errors over either a simplex or a duplex communication channel was solved at the basic level of data link control in the following paper:

Baratz, A.E. and Segall, A., "Reliable Link Initialization Procedures," IBM RC #9929, 3/15/83.

This invention solves the problem of resynchronization at a higher level for a full duplex session which is comprised of a pair of half duplex sessions.

The present invention solves the resynchronization problem set forth above:

1. Without requiring any memory; in particular, without using sequence numbers.
2. With a minimum of impact on the existing SNA LU 6.2 interface.
3. With a small number of flows.

The paper referred to above solves the analogous problem at a basic link control level, with the use of more flows and some requirement for memory. This invention, however, premises this link level solution as an underlying part of a correct LU 6.2 implementation.

The synchronization requirements of the APPN Control Point 20 are described below. To deal with errors which may disrupt Control Point sessions in a way that will preserve the correctness of the network control (Directory and Route Selection) algorithms, the System 36 APPN Control Point is structured in a way that requires certain integrity properties of the simulated duplex session.

These properties enable the Control Point processes to be resynchronized and, whenever the status of physical resources permits, restart-and-recovery processes to be effected.

The required properties for a logical session are:

1. After a logical (i.e. duplex) session failure, each Control Point component in each node must learn of the failure.

2. As part of session restart each component in each node must correctly distinguish the beginning of new sequences of messages from all old messages (messages associated with the old broken session).
3. The logical session must be reestablished in a finite amount of time (once no more errors occur).

The Appropriate resynchronization plainly involves two somewhat separable problems:
1. Inter-node Resynchronization (between the Control Points of two adjacent nodes).
2. Intra-node Resynchronization (among the Control Point components within a single node).

This invention addresses the first of these problems:

INTER-NODE RESYNCHRONIZATION

Property 2, the distinguishing of new from old messages, is accomplished between the Control Points of adjacent nodes by having an exchange of unique messages (which by their uniqueness identify themselves as the first of a new series) over each of the two physical sessions:

The Send module 36 (FIG. 3) is caused to initiate this exchange of unique messages by transmitting a Capability Request (hereafter termed an REQ) over the outgoing physical session. The adjacent node, upon receipt of the REQ, returns a Capability Response (hereafter termed an RSP) over the same session. (This is an exception to the general rule that messages flow only in a single direction over each of the two sessions).

The term Capability is used with these messages because they are also used by the two adjacent nodes to exchange information about the functional capabilities and other important characteristics of the nodes. However, for the purposes of this invention the content of these two messages is not relevant. Their only relevance is, as was noted above, that they are unique in the sense of being distinguishable from all other messages flowing on the session, and that they are the first pair of messages to be sent on a new session.

A case which produces some subtle difficulties in inter-node resynchronization is called the Ping Pong effect, and it occurs when one of the two Control Point physical sessions fails, and the other does not. It might appear that since the unique Capabilities messages are used to demarcate the beginning of new message streams on both sessions, that the sending of these unique messages (along with the restarting of the physical session which had broken) would be sufficient.

However, it turns out the Property 3—restart in a finite amount of time—cannot be assured if this is all that is done. To understand this surprising problem, it is necessary to look a little more closely at the dynamics of the relationship between logical and physical sessions.

A logical session is declared by the Control Point Manager 40 (FIG. 3) to be in UP state (components can begin to send and receive control traffic messages over it) when both of the underlying physical sessions are in an UP state.

An outgoing physical session is declared to be in UP state when a node has sent an REQ and received the answering RSP over it. An incoming session is declared UP when an REQ has been received on it, and the answering RSP has been sent (but not necessarily delivered). Thus it is evident that there are points in time when one node can perceive either a physical or logical session as not UP while its neighbor perceives it as UP. This asymmetry is perhaps the root of the synchronization difficulties.

Figure 4:
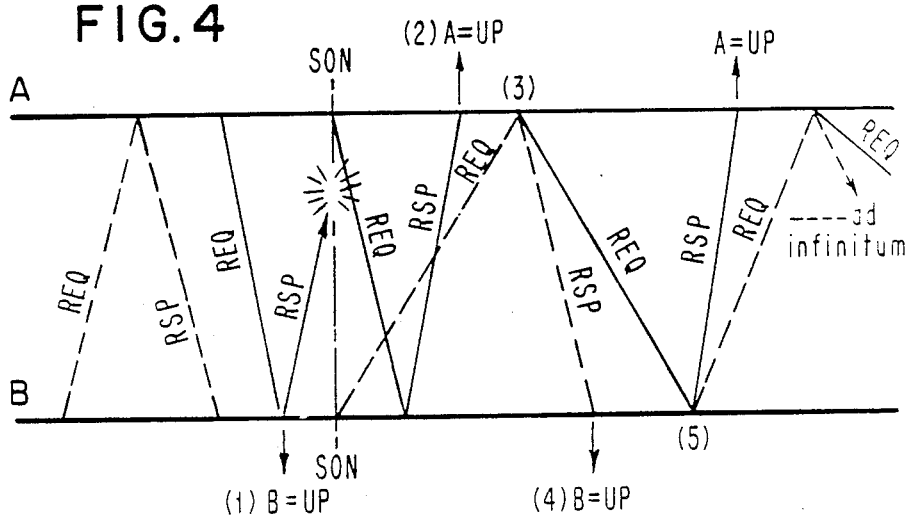
FIG. 4 is a diagram depicting the ping pong effect between two adjacent network nodes.

FIG. 4 shows how a non-terminating sequence can be produced: At time point (1) B perceives its logical session with A to be UP, since it has both sent a REQ and received an RSP on its outgoing session and also received an REQ and sent an RSP on its incoming session; but A perceives it as not UP, because A has not received the RSP from B yet.

The session shown in solid lines now breaks, producing a session outage notification (SON) message at both endpoints. This SON is perceived by B as the end of the first logical session which had come UP at (1), and hence B sends an REQ over its outgoing session. A is not expecting this REQ, which from B's viewpoint heralds the beginning of the second consecutive logical session, since A had not perceived the first such session as having been UP, i.e. having been even begun let alone ended, when it received the SON. In fact A now perceived this first session as UP at (2), as from its viewpoint both solid line and dashed line sessions are now for the first time both UP. As B, however, perceives the second logical session as not yet UP at (2), the mismatching perceptions of the two nodes have now been exactly reversed. When the REQ arrives at A at (3), A perceives that the first logical session must have ended as this REQ marks the opening message of a second logical session. Accordingly, it sends a matching REQ on its outgoing (solid lines) session to complete the opening of the second logical session. But the two nodes are now out of phase, and A perceives the second logical session as UP at (4) and interprets the (solid line) REQ when it arrives at (5) as the beginning of a third logical session. It accordingly sends out a matching REQ on its outgoing (dashed line) session to complete the opening of the third logical session, and in this manner the out of phase condition can be repeated indefinitely.

Each repetition depends on an RSP travelling via one session arriving before an REQ in transit on the other session. Since the flow of the two sessions is independent, this possibility cannot be excluded, and it would even be a likely outcome on the S/36 where each new REQ causes a new Target module to be established, entailing some set up and initialization processing, before it can be delivered to the Control Point.

Because of the back and forth rhythm, the phenomenon just described has been termed a ping pong effect.

A protocol which avoids the Ping Pong effect is described below. It may be recalled that the instance which gave rise to the ping pong effect was the case where one of the two physical sessions was DOWN and one was not. One notion for avoiding the effect is to cause the session which did not fail to be reset to a DOWN state in such a way that both nodes begin the recovery in phase with each other, perceiving both physical sessions and the logical duplex session to DOWN. An SNA command, UNBIND, is available to reset any physical session to DOWN.

The correct protocol which performs inter-node Control Point session resynchronization in System 36 APPN including the achievement of Property 3 (restart in a finite amount of time) is as follows:
1. The 2 physical half duplex sessions come up independently in each node:
When a node receives a session outage before both sessions are up (either initially when first bringing up the session pair, or, subsequently, during recovery processing when a recovered session fails) it simply retries (if the Send session (SS) which transmits away from the local node) or waits for the partner to retry (if the Receive session (RS) which transmits towards the local node).

2. Once either node is logically UP (both sessions perceived as UP):

If one node (which is logically up) receives an outage notification on one of the LU 6.2 sessions, it UNBINDs the other session.

This protocol in preventing potentially non-terminating exchanges relies on the link FIFO property to assure that the UNBIND operation is completed at both nodes before the session which was not subjected to UNBINDing can come up again. If this is not the case (for instance if the two sessions are permitted to exist on different links), an explicit protocol extension is required to provide this assurance that while one session is being unbound, the other does not come up:

(a) If the Send session (SS—transmitting away from the local node) has been subject to an UNBIND, the Control Point waits for either an UNBIND RESPONSE or an outage notification before sending an RSP on the Receive session (RS—transmitting towards the local node) in response to an incoming REQ.

(b) If the Receive session (RS) has been subject to an UNBIND, the Control Points waits for either an UNBIND RESPONSE or an outage notification before sending an REQ on the Send session (SS).

The foregoing protocol, including the extension, is the gist of this invention.

The following terms are used in the flow diagrams of FIGS. 5–10, and which terms express the method of this invention relative to the function of the Control point 20 of FIG. 3.

1. LS(Logical Session—the simulated full duplex session which consists of a pair of half duplex LU 6.2 sessions, oppositely directed).
2. SS(Send Session—that one of the two sessions transmitting away from a Network Node(NN)).
3. RS(Receive Session—that one of the two sessions through which an NN receives messages).
4. REQ(Capability Request—the message which an NN sends on its SS to request initiation of that SS).
5. RSP(Capability Response—the answer which an adjacent NN returns in response to an REQ. It flows on the same session as the REQ it answers).
6. SON (Session Outage Notification—a node is notified that a session is no longer operative).

Figure 5:
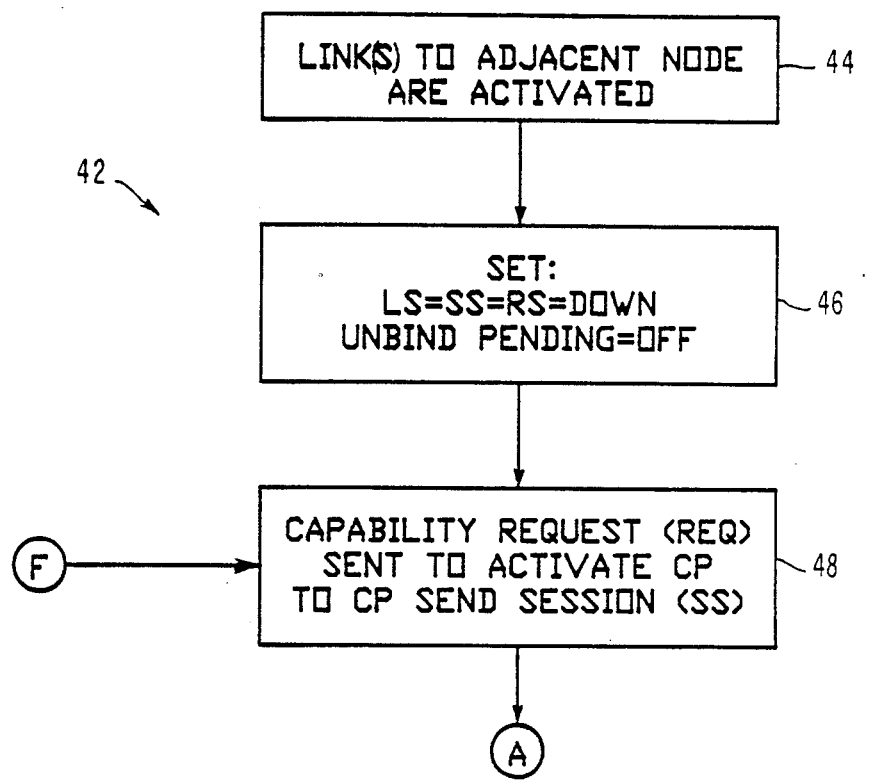
FIG. 5 is a flow chart representing control point flow between adjacent network nodes.

Refer now to FIG. 5, which is the control point (CP) flow logic 42. At 44 the appropriate link(s) to the adjacent node is (are) activated. For example, with reference to FIG. 2, the sessions 16 and 18 between nodes 4 and 6 may flow on either 1 link or 2 links, and this link or these links, as the case may be, are now activiated. Next, the logical session (LS), send session (SS) and receive session (RS) are all set to a DOWN condition, and the unbind pending condition is set to OFF as indicated at 46. Then, a capability request (REQ) is sent between the adjacent nodes to activate the CP to CP send session (SS) between the nodes as indicated at 48. As indicated at F, conditions depicted in FIG. 8 and FIG. 10, as will be described shortly, may also trigger the sending of an REQ by re-entering the flow at this point. At the exit from 48, a return is made to A of FIG. 6 to wait for the next session event.

Figure 6:
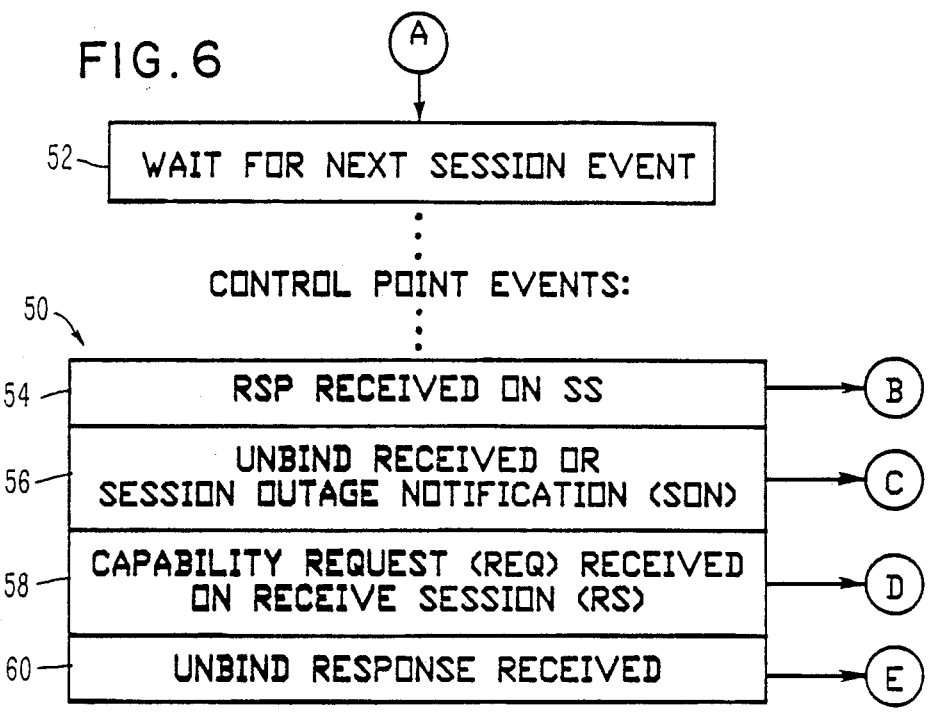
FIG. 6 is a flow chart representing control point events at a control point in a network node.

Refer now to FIG. 6, which is the control point flow chart 50. The next session event is waited for as indicated at 52. There are four possible session events. The first, as indicated at 54, is that a response (RSP) is received on the send session (SS), and this is described in detail relative to FIG. 7. The second, as indicated at 56 is that an UNBIND or session outage notification (SON) is received, and this is described in detail relative to FIG. 8. The third, as indicated at 58, is that a capability request (REQ) is received on the receive session (RS), and this is described in detail relative to FIG. 9. The fourth, as indicated at 60, is that an UNBIND response is received, and this is described in detail relative to FIG. 10.

Figure 7:
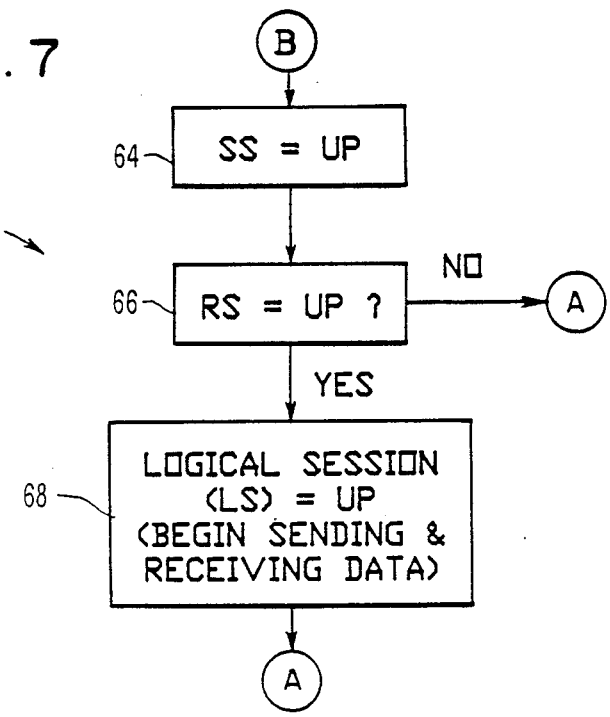
FIG. 7 is a flow chart representing how a response is received on a send session link.

Refer now to FIG. 7 which details the first event 54. At 64, the send session (SS) from a given network node is set equal to UP. At 66 a determination is made if the receive session (RS) is UP. If not, as indicated at A, a return is made to 52 of FIG. 6 to wait for the next session event. If so, as indicated at 68, the logical session (LS) is deemed to be UP, as both SS and RS are up, and data may be sent over the logical session between the given node and the adjacent node.

Figure 8:
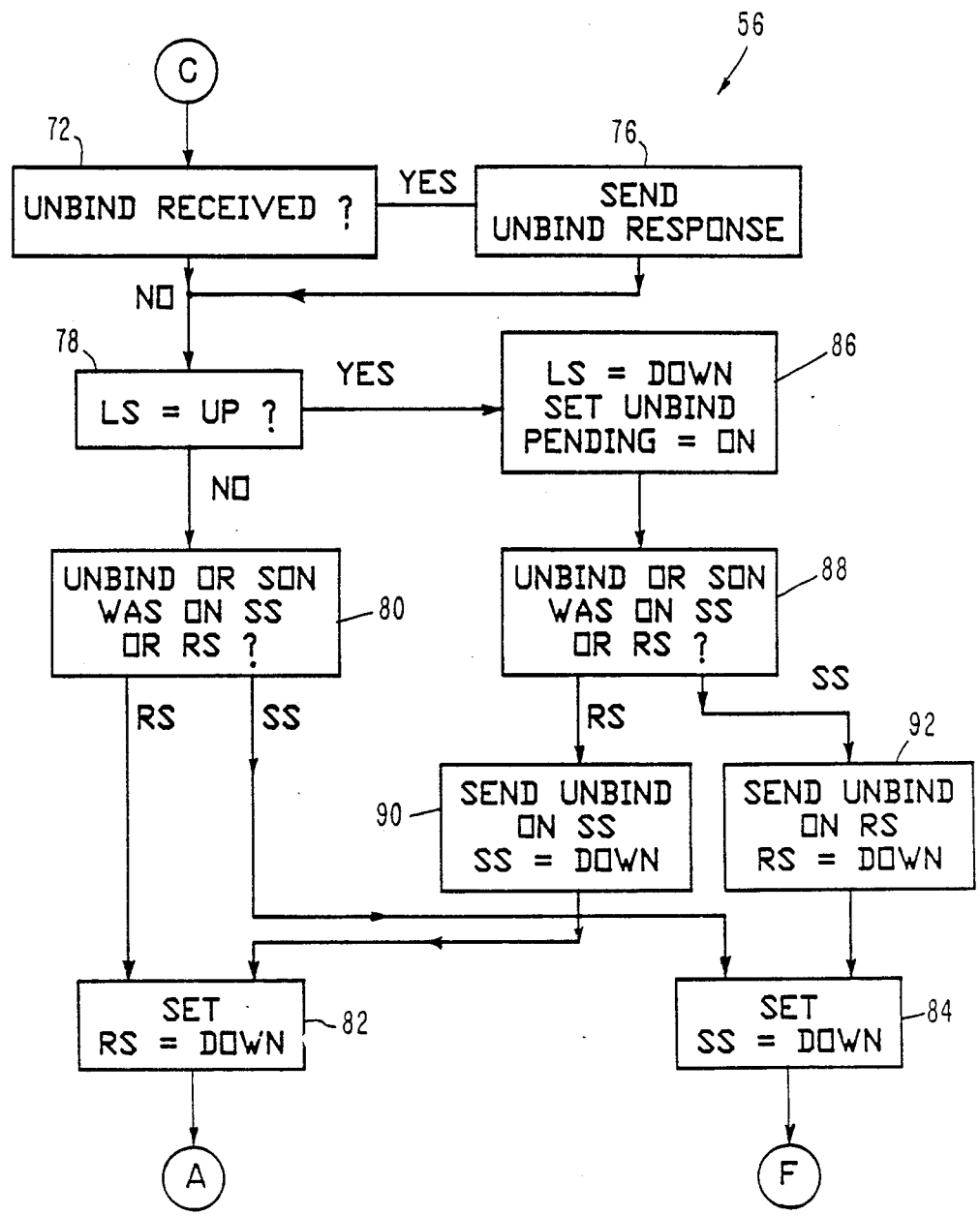
FIG. 8 is a flow chart representation indicative of determining what condition caused a session to be down.

Refer now to FIG. 8 which details the second event 56. At 72 a determination is made as to whether or not an UNBIND has been received from the adjacent node. If not, proceed to 78, and if so proceed to 76 and send an UNBIND response to the adjacent node to indicate the given session is now inactive.

At 78 a determination is made as to whether or not the logical session (LS) is UP. If not, proceed to 80 and determine if an UNBIND or SON was on the send session (SS) or the receive session (RS). If on RS, RS is set equal to DOWN as indicated at 82 and a return is made at A to 52 of FIG. 6 to wait for the next session event. If on SS, SS is set equal to DOWN as indicated at 84 and a return is made at F to 48 of FIG. 5 to make a capability request (REQ).

Returning to 78, if LS is equal to UP, proceed to 86 and set LS equal to DOWN and set UNBIND pending equal to ON. Next, at 88 a determination is made as to whether the UNBIND or SON was on the send session (SS) or the receive session (RS). If on RS, an unbind is sent on SS, and SS is set equal to Down. Next, RS is set to DOWN as indicated at 82 and a return is made at A to 52 of FIG. 6 to wait for the next session event.

Returning to 88, if the UNBIND or SON was on SS, proceed to 92 and send an UNBIND on RS, and set RS equal to down. At 84 set SS equal to DOWN and a return is made at F to 48 of FIG. 5 to make a capability request (REQ).

Figure 9:
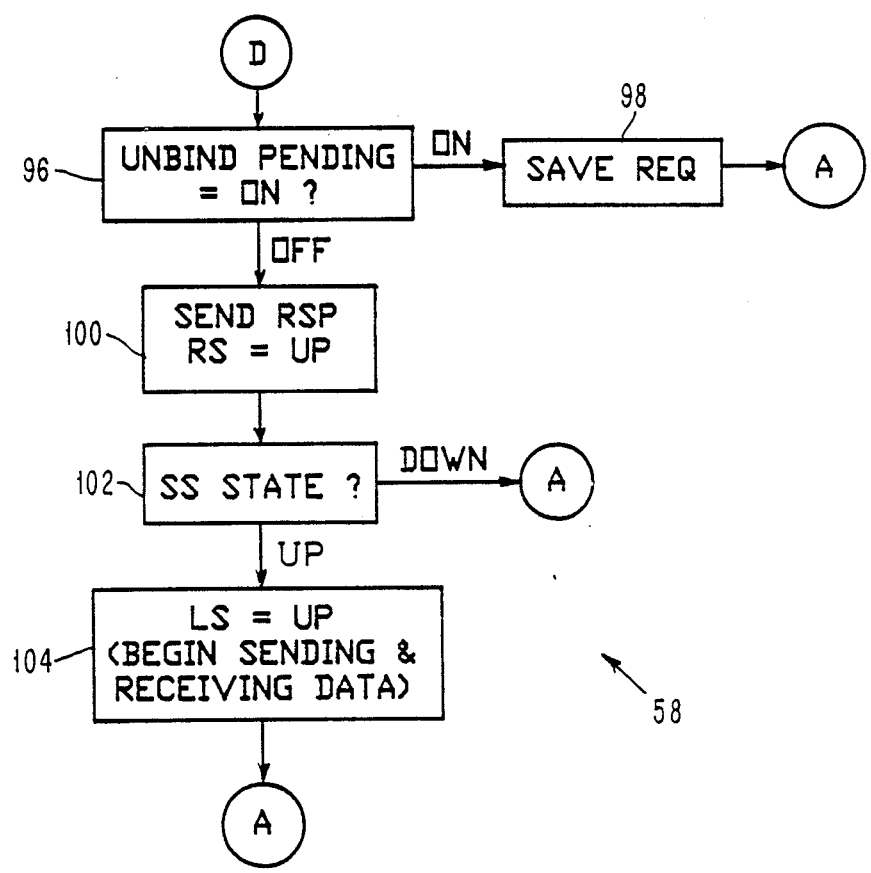
FIG. 9 is a flow chart representation of how a capability request is received on a receive session.

Refer now to FIG. 9 which details the third event 58. At 96 a determination is made as to whether or not UNBIND pending is equal to ON. If ON, the REQ which has been received is saved at 98 and a return is made at A to 52 of FIG. 5 to wait for the next session event. If OFF, as indicated at 100, a response is sent indicating that RS is UP. At 102 the state of the send session (SS) is determined. If SS is DOWN a return is made at A to 52 of FIG. 6 to wait for the next session event. If SS is UP proceed to 104 and LS is equal to UP as both RS and SS are UP and data may be sent and received over the logical session between the adjacent nodes, and a return is made at A to 52 of FIG. 6 to wait for the next session event.

Figure 10:
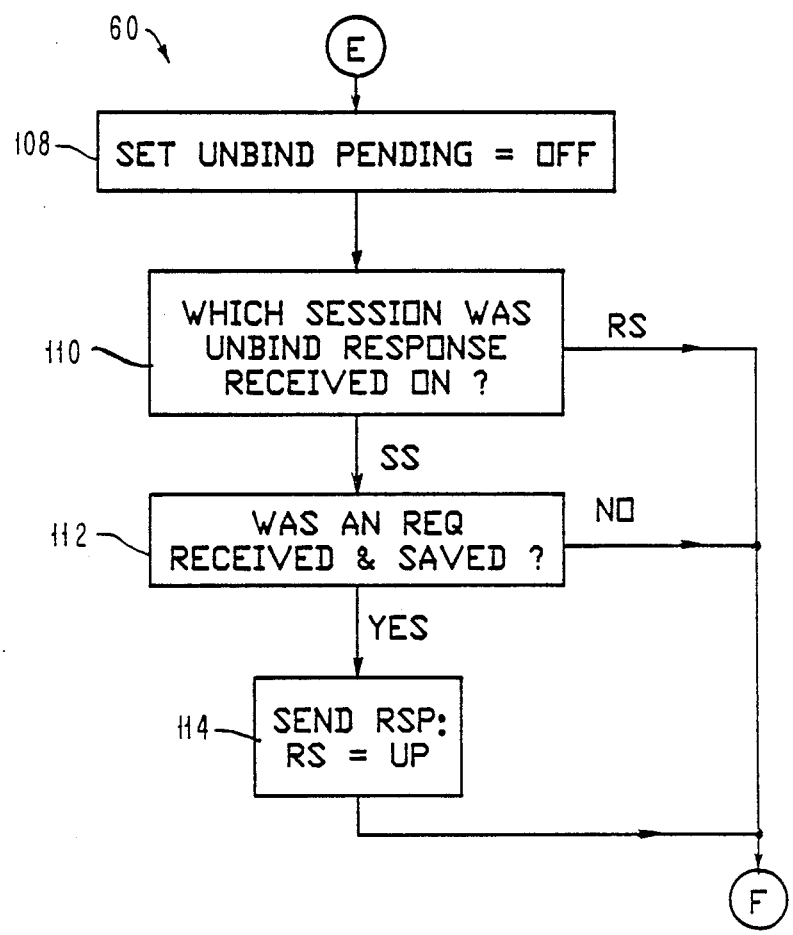
FIG. 10 is a flow chart representation of how an unbind response is received.

Refer now to FIG. 10 which details the fourth event 60 which is that an UNBIND response has been received. Therefore, as indicated at 108, UNBIND pending is set equal to OFF. Next, at 110 a determination is made as to which session the UNBIND response was on. If on RS a return is made at F to 48 of FIG. 5 to make a capability request (REQ). If on SS proceed to 112 and determine if an REQ was received and saved. If not, return to F as above, and if so, proceed to 114 and send a RSP and set RS equal to UP and then return to F as above.

INDUSTRIAL APPLICABILITY

It is an object of the invention to provide an improved method of operating a computer network.

It is another object of the invention to provide an improved method of resynchronizing the recovery of a control point session in a computer network.

It is yet another object of the invention to provide an improved method of resynchronizing the recovery of a control point logical full duplex session, comprised of two physical half duplex sessions, in a computer network.

It is still another object of the invention to provide an improved method of resynchronizing the recovery of a control point logical full duplex session, comprised of two physical half duplex sessions, in a computer network. Each half duplex session represents the send session of one node and the receive session of the adjacent node. In the event of a session failure at either node, the session from the other node is also deactivated so the nodes may begin recovery in phase with each other. Unique messages are exchanged between the adjacent nodes to distinguish new from old messages, such that the nodes are resynchronized only when new messages are present on each session.

Having thus described our invention, what we claim as new, and desired to secure by Letters patent is:

1. In a computer network comprised of at least two nodes including control points capable of sustaining a logical duplex session between the control points of said at least two nodes, with each logical duplex session being comprised of two physical half duplex sessions, with a logical duplex session being up when both physical half duplex sessions are up, and being down when at least one of said two physical half duplex sessions is down, a method of establishing a new logical duplex session, comprising:
   notifying the control point of one of said two nodes by the control point of the other one of said two nodes, that said control point of the other one of said two nodes has sensed that at least one of said two physical half duplex sessions is manifesting an error condition, and that said at least one physical half duplex session is down;
   bringing the other one of said two physical half duplex sessions down in response to the notification that said at least one duplex session is manifesting an error condition and is down;
   distinguishing by the control point at each of said two nodes of a down logical full duplex session from a new logical full duplex session based on the exchange of unique messages between the control points of said two nodes; and
   establishing said new logical full duplex session in a finite period of time once no error conditions are sensed on either of said two physical half duplex sessions by either of the control points of said two nodes.

2. In a computer network comprised of at least two nodes including control points capable of sustaining a logical duplex session between the control points of said at least two nodes, with each logical duplex session being comprised of two physical half duplex sessions, with a logical duplex session being up when both physical half duplex sessions are up, and being down when at least one of said two physical half duplex sessions is down, a method of beginning a new logical duplex session, comprising:
   determining by the control point of one of said two nodes that one of said two physical half duplex sessions is down;
   bringing the other one of said two physical half duplex sessions down in response to determining by the control point of one of said two nodes that said one of said two physical half duplex sessions is down; and
   beginning a new logical duplex session between said two nodes only after the determination by the control point of either one of said two nodes that said two physical half duplex sessions are concurrently down.

3. In a computer network comprised of a plurality of nodes including control points, with at least two adjacent nodes being capable of sustaining a logical duplex control point session comprised of two physical half duplex sessions, with a logical duplex session being up when both physical half duplex sessions are up, and being down when at least one of said two physical half duplex sessions is down, a method of beginning a logical duplex control point session following the failure of at least one of said two physical half duplex sessions, comprising:
   determining by the control point of one of said two nodes that one of said two physical half duplex sessions is down;
   bringing the other one of said two physical half duplex sessions down, while said one half duplex session down, in response to determining by the control point of one of said two nodes that said one of said two physical half duplex sessions is down;
   determining by the control point of one of said two nodes that said two physical half duplex sessions are simultaneously down; and
   beginning a new logical duplex control point session between said two adjacent nodes only following the determination by the control point of either one of said two nodes that said two physical half duplex sessions are simultaneously down.

4. In a computer network comprised of at least two nodes including control points, which are capable of sustaining a logical duplex session between the control points of said at least two nodes, with each logical duplex session being comprised of two physical half duplex sessions, with each half duplex session including the send session of one node and the receive session of the other node, a method of implementing the recovery of said logical duplex session comprising:
   responding to a physical half duplex session failure at either node by the control point at said either node, to deactivate the physical half duplex session from the other node;
   exchanging unique messages between the control points of said two nodes to distinguish new from old messages; and
   beginning a new logical full duplex session between the control points of said two nodes only when either one the control points of said two nodes determines that new messages are present on each of said half duplex sessions.

5. The method of claim 4, wherein said unique messages identify themselves as the first of a new series of messages.

6. The method of claim 5, wherein said unique messages comprises a Capability Request sent from the control point of one node to the control point of the other node on one of said half duplex sessions, and a Capability Response returned from the control point of said other node to the control point of said one node on the same half duplex session.

7. The method of claim 6, wherein said one of said half duplex sessions is declared UP when the control point of said one node has sent said Capability Request and received said Capability Response.

8. The method of claim 7, wherein the other one of said half duplex sessions is declared UP, when a Capability Request is received by the control point of said one node and a Capability Response is sent to the control point of said other node on said other one of said half duplex sessions.

9. The method of claim 8, wherein said logical full duplex session is declared UP when each of said physical half duplex sessions have been declared UP.

10. In a computer network comprised of at least two nodes including control points capable of sustaining a logical duplex session (LS) between the control points of said at least two nodes, with each LS being comprised of two physical half duplex sessions, with the first physical half duplex session including the first node's send session (SS1) and the second node's receive (RS2) and the second physical half duplex session including the first node's receive session (RS1) and the second node's send session (SS2), a method of implementing the recovery of said LS comprising:

responding to a physical half duplex session failure at the control point of either of said first and second nodes to deactivate the other physical half duplex session;

declaring by the control point of the first one of said two nodes that said first physical half duplex session is UP following the sending of a Capability Request on SS1 and receiving a Capability Response on RS2;

declaring by the control point of the second one of said two nodes that said second physical half duplex session is UP following the sending of a Capability Request on SS2 and receiving a Capability Response on RS1; and declaring by the control point of either one of said two nodes that said logical full duplex session is UP in response to said first and second physical half duplex sessions each having been declared UP.

* * * * *